(12) United States Patent
Nam et al.

(10) Patent No.: US 10,295,705 B2
(45) Date of Patent: May 21, 2019

(54) ANTI-REFLECTION GLASS SUBSTRATE AND METHOD FOR MANUFACTURING SAME

(71) Applicant: Corning Precision Materials Co., Ltd., Chungcheongnam-do (KR)

(72) Inventors: Jin Su Nam, Chungcheongnam-do (KR); Seon Ki Kim, Chungcheongnam-do (KR); Jung Keun Oh, Chungcheongnam-do (KR); Su Yeon Lee, Chungcheongnam-do (KR); Myeong Jin Ahn, Chungcheongnam-do (KR); Jae Ho Lee, Chungcheongnam-do (KR)

(73) Assignee: Corning Precision Materials Co., Ltd. (KR)

( * ) Notice: Subject to any disclaimer, the term of this patent is extended or adjusted under 35 U.S.C. 154(b) by 109 days.

(21) Appl. No.: 15/112,113

(22) PCT Filed: Jan. 5, 2015

(86) PCT No.: PCT/KR2015/000055
§ 371 (c)(1),
(2) Date: Jul. 15, 2016

(87) PCT Pub. No.: WO2015/108297
PCT Pub. Date: Jul. 23, 2015

(65) Prior Publication Data
US 2016/0327688 A1    Nov. 10, 2016

(30) Foreign Application Priority Data

Jan. 16, 2014   (KR) .................. 10-2014-0005464

(51) Int. Cl.
*B44C 1/22* (2006.01)
*G02B 1/11* (2015.01)
(Continued)

(52) U.S. Cl.
CPC ............ *G02B 1/11* (2013.01); *C03C 15/00* (2013.01); *G02B 1/12* (2013.01); *G02B 1/18* (2015.01); *G02B 2207/107* (2013.01)

(58) Field of Classification Search
CPC .. G02B 1/11; G02B 1/18; C03C 15/00; H01L 21/67075
(Continued)

(56) References Cited

U.S. PATENT DOCUMENTS 4,019,884 A     4/1977  Elmer et al.
4,944,986 A *   7/1990  Zuel ...................... C03C 15/00
                                                216/97
(Continued)

FOREIGN PATENT DOCUMENTS

CN      102307823 A     1/2012
CN      102785434 A     11/2012
(Continued)

OTHER PUBLICATIONS

Boric acid—Wikipedia, via https://en.wikipedia.org/wiki/Boric_acid ; pp. 1-10; No Date.*
(Continued)

*Primary Examiner* — Binh X Tran
(74) *Attorney, Agent, or Firm* — Lerner, David, Littenberg, Krumholz & Mentlik, LLP

(57) ABSTRACT

Provided is an anti-reflection glass substrate comprising an anti-reflection layer having a predetermined thickness from the surface, the anti-reflection glass substrate being characterized in that the anti-reflection layer has at least two layers of a first layer and a second layer successively provided in the depth direction from the surface, each of the first layer and the second layer has a plurality of pores, and the porosity of the first layer is smaller than the porosity of the second layer. In addition, provided is a method for manufacturing an
(Continued)

anti-reflection glass substrate, the method successively comprising a step of etching a glass substrate using a first etching liquid and a step of etching the glass substrate using a second etching liquid, the method being characterized in that the molarity of multivalent metal ions of the first etching liquid is larger than the molarity of multivalent metal ions of the second etching liquid. Provided is a method for manufacturing an anti-reflection glass substrate, the method successively comprising a step of etching a glass substrate using a first etching liquid and a step of etching the glass substrate using a second etching liquid, the method being characterized in that the molarity of hydroxides and fluorides of the first etching liquid is smaller than the molarity of hydroxides and fluorides of the second etching liquid.

15 Claims, 2 Drawing Sheets

(51) Int. Cl.
    *G02B 1/18*     (2015.01)
    *C03C 15/00*     (2006.01)
    *G02B 1/12*     (2006.01)

(58) Field of Classification Search
    USPC .......................... 216/56, 97, 98, 99; 438/756
    See application file for complete search history.

(56) References Cited

U.S. PATENT DOCUMENTS

| | | | |
|---|---|---|---|
| 8,445,309 B2 | 5/2013 | Buller et al. | |
| 2012/0148814 A1 | 6/2012 | Neander et al. | |
| 2013/0157008 A1* | 6/2013 | Aytug | C09D 5/00 428/141 |
| 2013/0192306 A1* | 8/2013 | Sugiyama | C03C 3/091 65/31 |
| 2014/0268348 A1* | 9/2014 | Jewhurst | G02B 1/11 359/601 |

FOREIGN PATENT DOCUMENTS

| | | |
|---|---|---|
| KR | 101175957 B1 | 8/2012 |
| KR | 20120138417 A | 12/2012 |

OTHER PUBLICATIONS

Sodium—Wikipedia, via https://en.wikipedia.org/wiki/Sodium ; pp. 1-15; No Date.*
Haxafluorosilicic acid—Wikipedia via https://en.wikipedia.org/wiki/Hexafluorosilicic_acid ; pp. 1-4; No Date.*
International Search Report for Application No. PCT/KR2015/000055 dated Apr. 20, 2015.
Yao et al., "Multifunctional Surfaces with Outstanding Mechanical Stability on Glass Substrates by Simple H2SiF6-Based Vapor Etching", Langmuir, 2013, 29 (9), pp. 3089-3096.

* cited by examiner (a)                      (b)

ANTI-REFLECTION GLASS SUBSTRATE AND METHOD FOR MANUFACTURING SAME

CROSS-REFERENCE TO RELATED APPLICATIONS

This application is a national phase entry under 35 U.S.C. § 371 of International Application No. PCT/KR2015/000055, filed on Jan. 5, 2015, published in Korean, which claims priority to Korean Patent Application No. 10-2014-0005464, filed on Jan. 16, 2014, the disclosures of which are incorporated herein by reference.

TECHNICAL FIELD

The present disclosure relates to an anti-reflective glass substrate and a method of manufacturing the same. The present disclosure also relates to a high quality anti-reflective glass substrate having both high transmittance characteristics and antifouling characteristics and a method of manufacturing the same.

BACKGROUND ART

Glass is a material typically allowing light to pass therethrough, but the transmittance of glass is commonly about 90%, since about 8% of light is commonly reflected from the surface of glass, while the remainder of light passes through the glass.

In a glass plate, such as a glass cover of a photovoltaic cell or a display glass cover, requiring a high level of transmittance, an anti-reflective layer may be formed on the glass surface to improve transmittance.

Although specific types of processing, such as spraying, sol-gel processing, sputtering, and etching, may be used to form anti-reflective layers, anti-reflective in consideration of productivity, uniformity of anti-reflective layer, and degree of anti-reflective effect, anti-reflective layers may also be formed by etching.

Glass having an anti-reflective layer formed using a currently-available etching process has a relatively high level of transmittance of 97% or higher (about 94.5% when a single anti-reflective layer is provided on one surface), but may be easily fouled by impurities since relatively large pores are formed in the surface thereof.

To overcome the fouling problem, a fluoropolymer coating, the formation of concave and concave structures, and the like have been researched. However, there may be a problem with respect to long-term reliability, and the added process may lead to an increase in manufacturing costs.

DISCLOSURE

Technical Problem

Accordingly, the present invention has been made keeping the above problems occurring in the related art in consideration, and the present invention provides an anti-reflective glass substrate having superior antifouling characteristics while having an improved level of transmittance.

Technical Solution

According to an aspect, the present disclosure provides an anti-reflective glass substrate including an anti-reflective layer formed to a predetermined depth from the surface of the anti-reflective glass substrate. The anti-reflective layer includes at least two layers, a first layer and a second layer sequentially disposed in a depth direction from the surface. Each of the first and second layers has a plurality of pores, a porosity of the first layer being lower than a porosity of the second layer. Here, the porosity refers to the ratio of the volume of pores with respect to the overall volume.

The thickness of the first layer may be greater than 10±5 nm and equal to or less than 50±5 nm.

In addition, the present disclosure provides a method of manufacturing an anti-reflective glass substrate including an anti-reflective layer formed to a predetermined depth from a surface of the anti-reflective glass substrate. The method includes: etching a glass substrate using a first etching solution; and etching the glass substrate using a second etching solution, the first etching solution having a greater polyvalent metal ion molarity than the second etching solution.

The polyvalent metal ion molarity may be a polyvalent metal ion molarity of at least one selected from the group consisting of aluminum (Al), lanthanum (La), boron (B), calcium (Ca), magnesium (Mg), barium (Ba), nickel (Ni), cobalt (Co), copper (Cu), and zinc (Zn).

A difference in the polyvalent metal ion molarity between the first etching solution and the second etching solution may be greater than $3.3 \times 10^{-4}$ M and is equal to or less than $9.0 \times 10^{-4}$ M.

In addition, the present disclosure provides a method of manufacturing an anti-reflective glass substrate comprising an anti-reflective layer formed to a predetermined depth from a surface of the anti-reflective glass substrate. The method includes: etching a glass substrate using a first etching solution; and etching the glass substrate using a second etching solution, the first etching solution having a greater hydroxide or fluoride molarity than the second etching solution.

The hydroxide or fluoride molarity may have a molarity of $B(OH)_3$ or KF.

Each of the first etching solution and the second etching solution may include i) $H_2SiF_6$, ii) $SiO_2$, and iii) a hydroxide and/or a fluoride.

According to a preferable embodiment, the first etching solution is produced by adding a water-soluble metal compound containing polyvalent metal ions to a basic etching solution in which i) $H_2SiF_6$, ii) $SiO_2$, and iii) a hydroxide and/or a fluoride are mixed, and the second etching solution comprises a basic etching solution in which i) $H_2SiF_6$, ii) $SiO_2$, and iii) a hydroxide and/or a fluoride are mixed.

According to another preferable embodiment, the first etching solution may be produced by adding a water-soluble metal compound containing polyvalent metal ions to a basic etching solution in which i) $H_2SiF_6$, ii) $SiO_2$, and iii) a hydroxide and/or a fluoride are mixed, and the second etching solution is produced by adding a hydroxide and/or a fluoride to the first etching solution.

Advantageous Effects

According to the present disclosure as set forth above, it is possible to impart antifouling characteristics to an anti-reflective article formed using an etching process. Thus, as an effect of the present disclosure, it is possible to provide a glass substrate having high-transmittance characteristics. In addition, the present disclosure can reduce defects caused by contamination, can reduce user complaints caused by contamination, and can be applied to products frequently touched by users.

MODE FOR INVENTION

Figure 1:
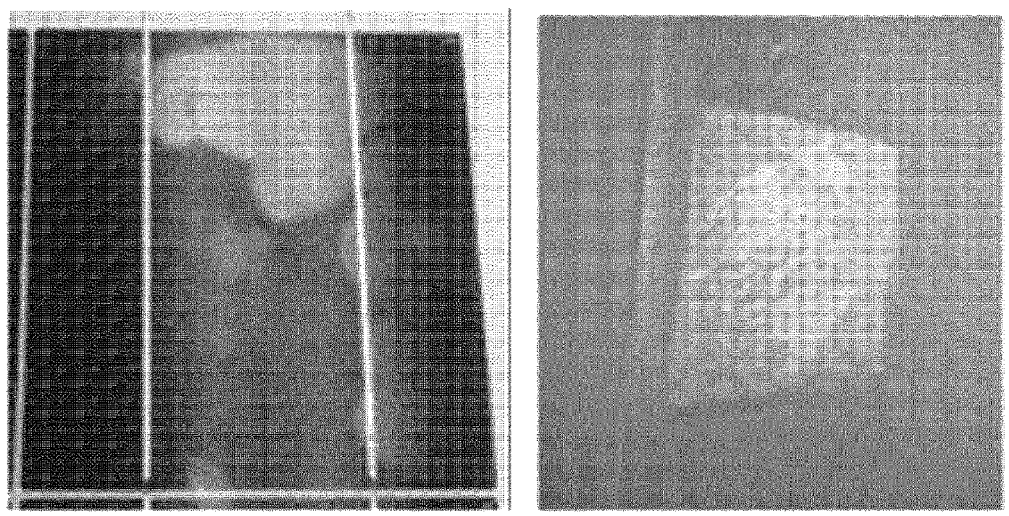
FIG. 1 is images showing anti-reflective layers etched using a conventional etching solution contaminated with fingerprints and tape.

In the conventional art, a silica layer, as a conventional anti-reflective layer, including a nanoporous layer, is formed on a surface of glass to realize anti-reflective characteristics. The anti-reflective layer has relatively large pores exposed on the surface thereof, such that impurities may infiltrate through the open pores to fill pores within the anti-reflective layer. Impurities filling the pores may not be able to be easily removed through cleaning, thereby reducing the anti-reflective effect.

To overcome this problem, the applicant developed a technology using an etching process which allows the porosity of an anti-reflective layer to be adjusted, thereby forming an etched anti-reflective layer. However, the transmittance was lowered to a level of 96% or below (94.0% when a single anti-reflective layer was provided on one surface), which is problematic.

The etching process has a higher degree of freedom in structural modification than other processes. That is, it is possible to easily modify the structure of an anti-reflective layer, depending on the reaction temperature, the reaction time, the concentration of an etching solution, and conditions.

It is possible to modify the structure of the anti-reflective layer by modifying the etching conditions, such that the anti-reflective layer has a high-density surface and a high-porosity interior. An anti-reflective layer allowing for a level of transmittance of 94.5% or higher (when the anti-reflective layer is formed on one surface) and antifouling characteristics may be formed. In this manner, the inventors developed a method of forming an anti-reflective layer having both high-transmittance characteristics and antifouling characteristics using only an etching process.

An etching solution used in a conventional etching process is manufactured by saturating a $H_2SiF_6$ solution with $SiO_2$ and adding KF or $B(OH)_3$ thereto, such that an optimal etching process can be performed.

Although the etching solution used in the conventional etching process can form an anti-reflective layer having a level of transmittance of 98% or higher, the resultant anti-reflective layer is vulnerable to contamination since foreign materials may easily infiltrate through large open pores.

Since contaminants infiltrate through the pores, it is possible to reduce the infiltration of contaminants by reducing porosity. Pores are vulnerable to contaminants since the contaminants may be trapped in the pores once having entered thereinto. The present disclosure has been devised so as to reduce the porosity to reduce the entrance of contaminants into pores, thereby improving antifouling characteristics of the anti-reflective layer.

However, the reduced porosity increases the refractive index of the anti-reflective layer, thereby increasing reflectance, which is problematic. That is, anti-reflective characteristics are lowered.

It is therefore possible to form an anti-reflective layer having both high-transmittance characteristics and antifouling characteristics by reducing only the porosity of pores localized in the surface of the anti-reflective layer while maintaining the porosity of the interior thereof.

Figure 2:
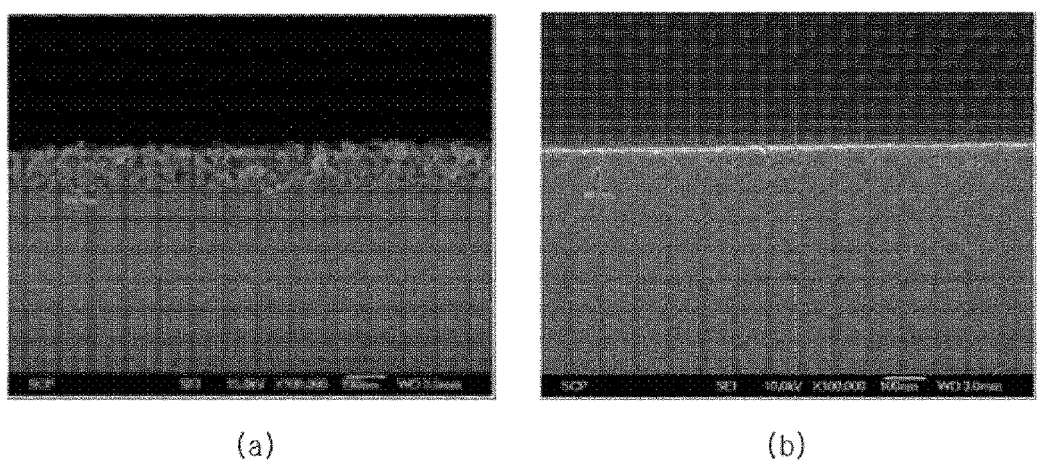
FIG. 2 is images showing (a) an anti-reflective layer etched using a conventional etching solution and (b) an anti-reflective layer etched using an etching solution having B added thereto.

According to experiments, in the case of modifying the structure of an anti-reflective layer using an etching process, it was possible to modify the structure of the anti-reflective layer by adding a predetermined amount of polyvalent metal ions, such as Al, La, B, Ca, Mg, Ba, Ni, Co, Cu, or Zn, to a conventional etching solution (see FIG. 2). Any type of water-soluble agent containing polyvalent metal ions is available. $Al_2(SO_4)_3$, $La_2(NO_3)_3$, $H_3BO_3$, $AlCl_3$, $CaCl_2$, $MgSO_4$, $BaCl_2$, $NiCl_2$, $CoCl_2$, $ZnCl_2$, $CuCl_2$, and so on can typically be used.

The technology of modifying the structure as described above may be applied to form a surface structure as shown in (b) of FIG. 2 and an interior structure as shown in (a) of FIG. 2.

Figure 3:
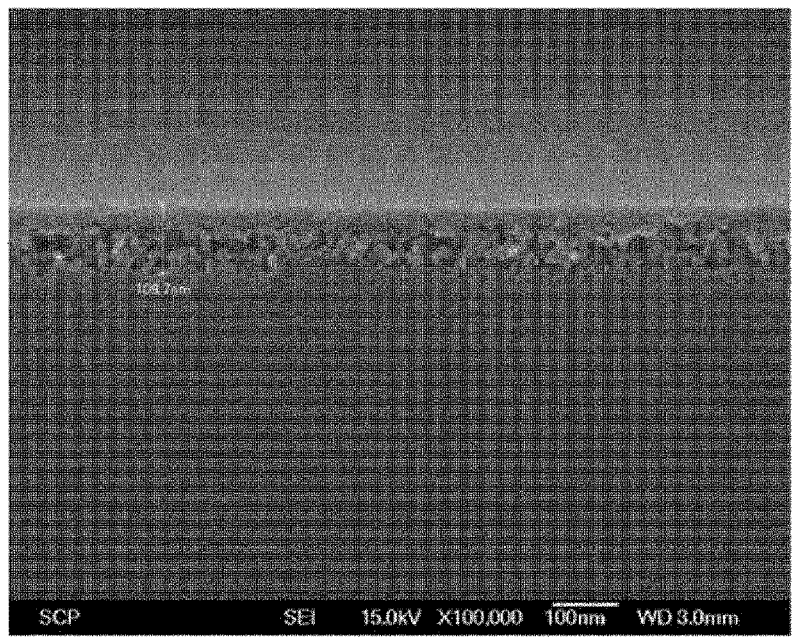
FIG. 3 is an image showing an anti-reflective glass substrate including an anti-reflective layer having a multilayer according to one embodiment of the present disclosure.
Figure 4:
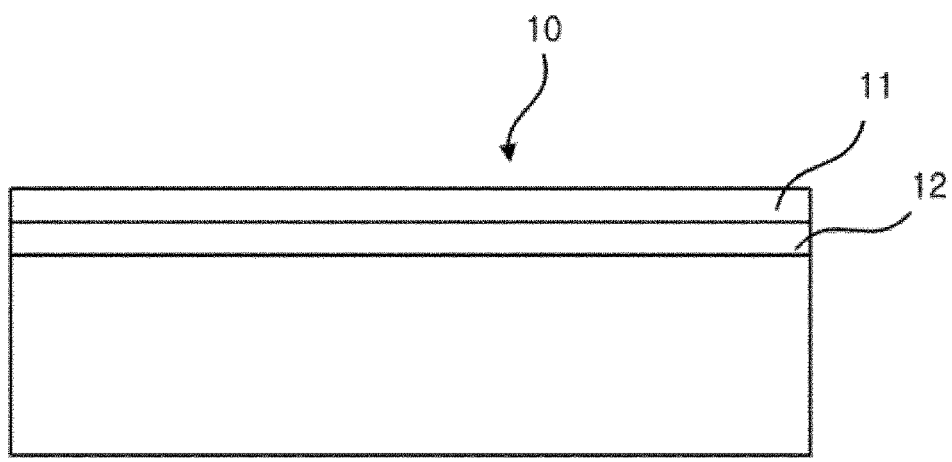
FIG. 4 is an illustration of an anti-reflective glass substrate including an anti-reflective layer having a multilayer according to one embodiment of the present disclosure.

A conventional etching solution and an etching solution having polyvalent metal ions added thereto are prepared. A glass substrate is allowed to react with the etching solution containing the polyvalent metal ions over a predetermined period of time and is then allowed to react with the conventional etching solution, thereby producing an anti-reflective glass substrate 10 in which a first layer 11 having a lower degree of porosity and a second layer 12 having a higher degree of porosity are formed sequentially in the depth direction from the surface, as shown in FIG. 3. The porosity of first layer may range from about 5% to about 35%. When the porosity of the first layer is higher than 35%, no antifouling characteristics are obtained. When the porosity of the first layer is lower than 5%, the double-layer structure is not obtained. The porosity of the second layer may range from about 45% to about 55%.

When the glass substrate is etched using the prepared etching solutions, some components, such as Na, K, Ca, Mg, or Al, elute from glass, thereby forming an anti-reflective layer in the depth direction from the surface of the glass substrate.

The thickness of the first layer 11 and the thickness of the second layer 12 may be adjusted by changing the period of reaction time. However, an increase in the thickness of the first layer 11 reduces the anti-reflective function, and a decrease in the thickness of the first layer 11 reduces the antifouling function.

The multilayer may be formed not only through the two etching steps as described above not also by adding KF to an etching solution during reaction.

In this reaction, the polyvalent metal ions in the etching solution acts to reduce the activity of F ions in the etching solution. KF is added to reincrease the activity of F ions. For example, when $8.8 \times 10^{-4}$ M of F is added to a solution produced by adding $8.8 \times 10^{-4}$ M of B ions to a conventional etching solution, an anti-reflective layer having the same structure as that of an anti-reflective layer produced using a conventional etching solution can be formed. That is, it is possible to form a multilayer structure as shown in FIG. 3 by allowing the glass substrate to react with a solution produced by adding $8.8 \times 10^{-4}$ M of B ions to the conventional etching solution over a predetermined period of time, adding $8.8 \times 10^{-4}$ M of F to the resultant solution, and then continuing performing a reaction over a predetermined period of time.

The etching solution that first reacts with the glass substrate to obtain antifouling characteristics may include polyvalent metal ions, the amount of which is greater than $3.3 \times 10^{-4}$ M and is equal to or less than $9.0 \times 10^{-4}$. When the added amount of polyvalent metal ion is less than $3.3 \times 10^{-4}$ M, no antifouling characteristics are obtained. When the added amount of polyvalent metal ion is greater than $9.0 \times 10^{-4}$ M, no multi-layered anti-reflective layer is formed.

Although the agent added may be selected from among $Al_2(SO_4)_3$, $La_2(NO_3)_3$, $H_3BO_3$, $AlCl_3$, $CaCl_2$, $MgSO_4$, $BaCl_2$, $NiCl_2$, $CoCl_2$, $ZnCl_2$, $CuCl_2$, and so on, $H_3BO_3$ may be most preferable in consideration of the price of the added agent and the reaction time.

The glass substrate may be formed from soda-lime or non-alkaline aluminosilicate. Soda-lime-based glass may be chemically-toughened glass, the strength of which is increased by chemical processing of replacing Na ions with K ions.

EXAMPLES

1. Antifouling Characteristics and High-Transmittance Characteristics Through Formation of Multilayer Anti-Reflective Layer In order to compare levels of reflectivity due to the formation of multilayers, the levels of transmittance of glass substrates having anti-reflective layers were measured using an ultraviolet-visible light spectrometer (Perkin-Elmer Lamda 950).

Each of the glass substrates used in the present test is formed from low-iron soda-lime glass, with a pattern being formed on the bottom abutting ethylene-vinyl acetate (EVA). When the transmittance is measured in this state, incorrect data may be obtained. It is therefore required to measure transmittance by avoiding light scattering due to the pattern. Methods of avoiding light scattering due to the pattern include a method of removing the pattern by polishing before measuring the transmittance and a method of removing the effect of the pattern by applying a solution, the refractive index of which is similar to that of the glass, to the surface of the glass substrate and covering the solution with glass having a smooth surface. In the present test, the latter method was used to measure transmittance.

The antifouling characteristics of samples were evaluated using a tape and oil-based ink. The tape evaluation was performed by attaching pieces of tape to top surfaces of anti-reflective layers formed through etching, detaching the pieces of tape from the anti-reflective layer after the lapse of a predetermined period of time, and evaluating whether or not a residue of an adhesive material of the tape remained in the anti-reflective layers. When an anti-reflective layer has large pores in the surface, the adhesive material of the tape will infiltrate into pores and will remain in the pores after the pieces of tape are detached from the anti-reflective layers. The tape used in the tape evaluation was 3M's No. 810. The oil-based ink evaluation was performed by dropping oil-based ink on anti-reflective layers, wiping ink drops using 5% IPA after the lapse of a predetermined period of time, and evaluating whether or not ink marks remained on the anti-reflective layers. When an anti-reflective layer has large pores in the surface, ink marks will remain after being wiped with 5% IPA.

Etching solutions for forming the first layer 11 were prepared by adding different amounts of B ions, and a conventional etching solution for forming the second layer 12 was used as it is. A reaction time for the first layer 11 was 10 minutes, and a reaction time for the second layer 12 was 45 minutes. The transmittances of the samples were measured, and the antifouling characteristics thereof were evaluated. When the amount of B ions added to the etching solutions used in the formation of the first layer 11 was greater than $3.3 \times 10^{-4}$ M and was equal to or less than $9.0 \times 10^{-4}$ M, a high level of transmittance of 94.5% with respect to the cross-section was observed. In addition, antifouling characteristics against a tape and oil-based ink were observed. When the amount of B ions added to the etching solution used in the formation of the first layer was equal to or less than $3.3 \times 10^{-4}$ M, no antifouling characteristics were observed since the pores of the first layer 11 were too large. When the amount of B ions added was greater than $9.0 \times 10^{-4}$ M, no anti-reflective layer was formed, thereby exhibiting no anti-reflective characteristics.

TABLE 1

Transmittance and Antifouling Characteristics of Multilayer Anti-reflective Layer Formed by Etching Method of the Present Disclosure

| | Samples | | | | | |
| --- | --- | --- | --- | --- | --- | --- |
| | #1 | #2 | #3 | #4 | #5 | #8 |
| Mole number of B added to $1^{st}$ etching solution | 0.0 | $3.3 \times 10^{-4}$ | $6.6 \times 10^{-4}$ | $8.3 \times 10^{-4}$ | $9.0 \times 10^{-4}$ | $9.9 \times 10^{-4}$ |
| Transmittance when a single anti-reflective layer is provided on one surface | 95.4% | 95.2% | 95.2% | 95.0% | 94.8% | 92.5 |
| Antifouling characteristics | NG | NG | GD | GD | GD | GD |

2. Antifouling and High-Transmittance Characteristics According to Thicknesses of Layers Samples were manufactured using an etching solution produced by adding $8.3 \times 10^{-4}$ M of B ions to a conventional etching solution as an etching solution for forming the first layer 11 and varying reaction times for respective layers. The transmittances by a single anti-reflective layer formed on one surface of a glass substrate were measured and the antifouling characteristics were evaluated in the same manner as in the test for Example 1 above. The thicknesses of the layers may be adjusted through reaction times, and changes in the thicknesses depending on reaction times may vary depending on reaction conditions, such as the composition of glass, the concentrations of the etching solutions, reaction times, and so on. Errors in the thicknesses presented in Table 2 were ±5 nm. When the thickness of the first layer 11 was equal to or less than 10±5 nm, a high level of transmittance of 95.2% was observed. However, the first layer 11 was too thin to entirely prevent contaminants from infiltrating. When the thickness of the first layer 11 was greater than 10±5 nm and was equal to or less than 50±5 nm, both a high level of transmittance of 94.5% and a characteristic of preventing the infiltration of contaminants, such as the adhesive material of the tape and the oil-based ink, were observed. However, when the thickness of the first layer 11 was greater than 50±5 nm, there was a problem of decreased transmittance.

TABLE 2

Transmittance and Antifouling Characteristics according to Thicknesses of Layers of Multilayer Anti-reflective Layer Manufactured by Etching

| Samples | #7 | #8 | #9 | #10 |
|---|---|---|---|---|
| Thickness of $1^{st}$ layer (nm)/thickness of second layer (nm) | 10/100 | 20/90 | 40/70 | 80/20 |
| transmittance when a single anti-reflective layer is provided on one surface | 95.2% | 95.0% | 95.0% | 93.5% |
| Antifouling characteristics | NG | GD | GD | GD |

The invention claimed is:

1. A method of manufacturing an anti-reflective glass substrate comprising an anti-reflective layer formed to a predetermined depth from a surface of the anti-reflective glass substrate, the method sequentially comprising:
    etching a glass substrate using a first etching solution; and
    etching the glass substrate using a second etching solution,
    wherein the first etching solution has a greater polyvalent metal ion molarity than the second etching solution,
    wherein the anti-reflective layer comprises at least two layers, including a first layer and a second layer, the second layer being disposed between the surface and the first layer,
    wherein each of the first and second layers has a plurality of pores, a porosity of the first layer being lower than a porosity of the second layer.

2. The method of claim 1, wherein the polyvalent metal ion molarity comprises a polyvalent metal ion molarity of at least one selected from the group consisting of aluminum (Al), lanthanum (La), boron (B), calcium (Ca), magnesium (Mg), barium (Ba), nickel (Ni), cobalt (Co), copper (Cu), and zinc (Zn).

3. The method of claim 1, wherein a difference in the polyvalent metal ion molarity between the first etching solution and the second etching solution is greater than $3.3 \times 10^{-4}$ M and is equal to or less than $9.0 \times 10^{-4}$ M.

4. The method of claim 1, wherein each of the first etching solution and the second etching solution comprises i) $H_2SiF_6$, ii) $SiO_2$, and iii) a hydroxide and/or a fluoride.

5. The method of claim 1, wherein
    the first etching solution is produced by adding a water-soluble metal compound containing polyvalent metal ions to a basic etching solution in which i) $H_2SiF_6$, ii) $SiO_2$, and iii) a hydroxide and/or a fluoride are mixed, and
    the second etching solution comprises a basic etching solution in which i) $H_2SiF_6$, ii) $SiO_2$, and iii) a hydroxide and/or a fluoride are mixed.

6. The method of claim 1, wherein
    the first etching solution is produced by adding a water-soluble metal compound containing polyvalent metal ions to a basic etching solution in which i) $H_2SiF_6$, ii) $SiO_2$, and iii) a hydroxide and/or a fluoride are mixed, and
    wherein the second etching solution is produced by adding a hydroxide and/or a fluoride to the first etching solution.

7. The method of claim 1, wherein the porosity of the first layer ranges from 5% to 35%, and the porosity of the second layer ranges from 45% to 55%.

8. The method of claim 1, wherein a thickness of the first layer is greater than 5 nm and is equal to or less than 55 nm.

9. A method of manufacturing an anti-reflective glass substrate comprising an anti-reflective layer formed to a predetermined depth from a surface of the anti-reflective glass substrate, the method sequentially comprising:
    etching a glass substrate using a first etching solution; and
    etching the glass substrate using a second etching solution,
    wherein the first etching solution has a greater hydroxide or fluoride molarity than the second etching solution,
    wherein the anti-reflective layer comprises at least two layers, including a first layer and a second layer, the second layer being disposed between the surface and the first layer,
    wherein each of the first and second layers has a plurality of pores, a porosity of the first layer being lower than a porosity of the second layer.

10. The method of claim 9, wherein the hydroxide or fluoride molarity comprises a molarity of $B(OH)_3$ or KF.

11. The method of claim 9, wherein each of the first etching solution and the second etching solution comprises i) $H_2SiF_6$, ii) $SiO_2$, and iii) a hydroxide and/or a fluoride.

12. The method of claim 9, wherein
    the first etching solution is produced by adding a water-soluble metal compound containing polyvalent metal ions to a basic etching solution in which i) $H_2SiF_6$, ii) $SiO_2$, and iii) a hydroxide and/or a fluoride are mixed, and
    the second etching solution comprises a basic etching solution in which i) $H_2SiF_6$, ii) $SiO_2$, and iii) a hydroxide and/or a fluoride are mixed.

13. The method of claim 9, wherein
    the first etching solution is produced by adding a water-soluble metal compound containing polyvalent metal ions to a basic etching solution in which i) $H_2SiF_6$, ii) $SiO_2$, and iii) a hydroxide and/or a fluoride are mixed, and
    wherein the second etching solution is produced by adding a hydroxide and/or a fluoride to the first etching solution.

14. The method of claim 9, wherein the porosity of the first layer ranges from 5% to 35%, and the porosity of the second layer ranges from 45% to 55%.

15. The method of claim 9, wherein a thickness of the first layer is greater than 5 nm and is equal to or less than 55 nm.

* * * * *